April 21, 1953 — W. F. GIBBY — 2,635,693
DEVICE FOR DICING SHEET MATERIAL
Filed Feb. 18, 1949 — 2 SHEETS—SHEET 1
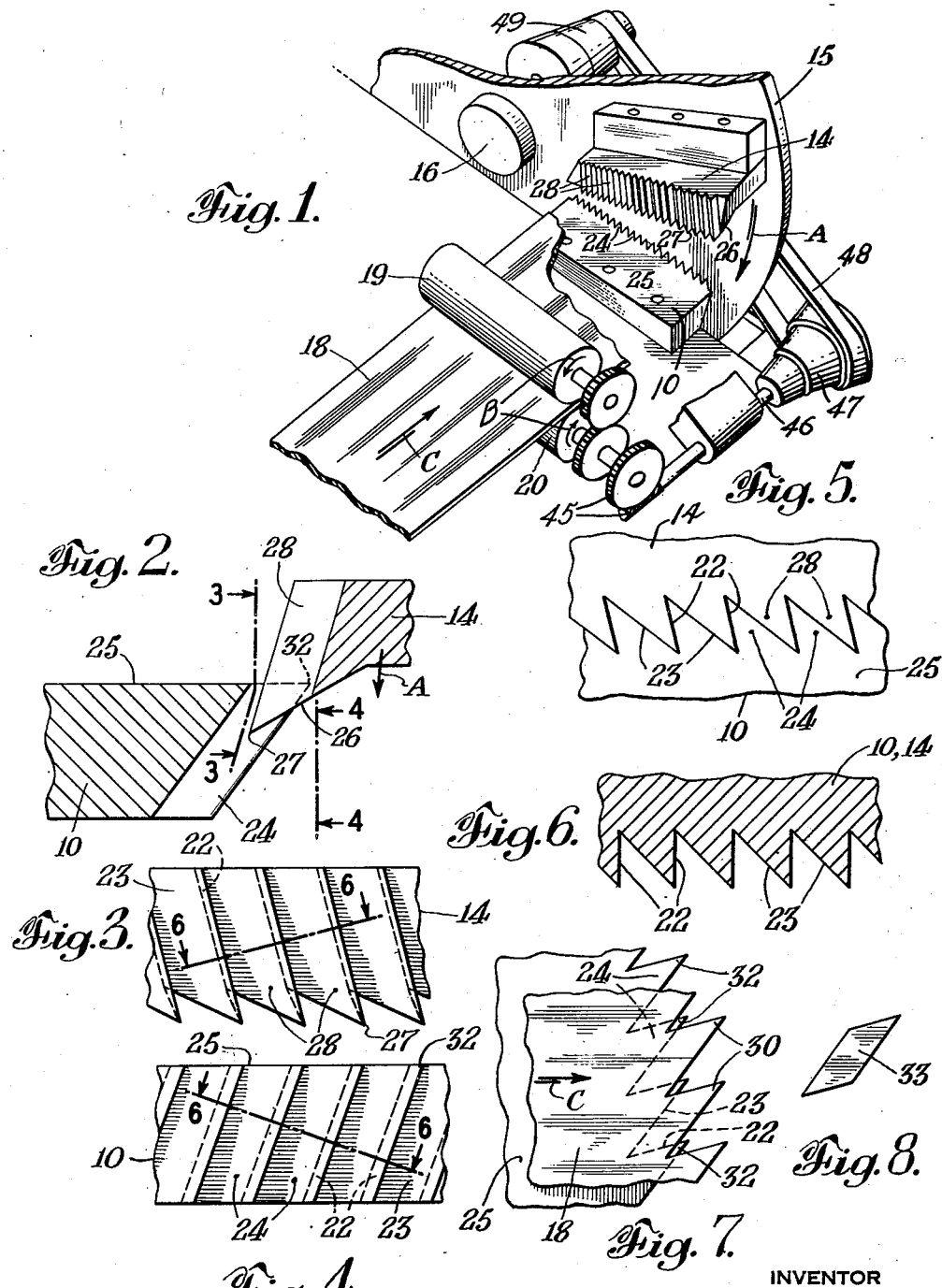
INVENTOR
WILLIAM F. GIBBY
BY
D.C.Harrison
ATTORNEY April 21, 1953     W. F. GIBBY     2,635,693
DEVICE FOR DICING SHEET MATERIAL
Filed Feb. 18, 1949     2 SHEETS—SHEET 2

INVENTOR
WILLIAM F. GIBBY
BY
ATTORNEY

Patented Apr. 21, 1953

2,635,693

UNITED STATES PATENT OFFICE 2,635,693

DEVICE FOR DICING SHEET MATERIAL

William F. Gibby, Berkeley Heights, N. J., assignor, by mesne assignments, to Union Carbide and Carbon Corporation, a corporation of New York Application February 18, 1949, Serial No. 77,081

11 Claims. (Cl. 164—61)

This invention relates to apparatus for dicing sheet material, and more particularly to apparatus of this character for producing granular products from plastic sheets.

In the manufacture of plastics for molding purposes, it is necessary to put the plastic into comminuted form for convenient handling and packaging and for ready pourability in the molding machine. With certain plastics, particularly elastomerics, the material cannot be ground or reduced to molding powder, and it has been proposed to form such plastic into a sheet, and cut the plastic sheet along a serrated line such as is produced by pinking shears, and to make a second cut spaced back from the first, to cut off a series of dice or pellets. But the resilient nature of the material is such that the compression of cutting tends to squeeze the material along the cutting edge in the direction of cut. This squeezed material forms webs or threads connecting the particles which prevents them from being completely severed, but instead leaves them connected as strings or chains.

The main object of the present invention is to eliminate these webs or threads, and to produce a free-flowing, uniformly-sized granular product.

Dicing machines heretofore employed have been provided with rectangular teeth, and in order to provide cutting clearance, the teeth had to be undercut in a plane transverse to the sheet. This required at least two passes of the cutter or grinder to manufacture each tooth. Furthermore, any further grinding to sharpen the teeth after they had become dulled in use, resulted in excessive increase in the clearance. It is therefore a further object of the present invention to provide teeth for a dicing machine which can be manufactured by one pass of the cutter or grinder, and which can be sharpened without increasing the tooth clearance.

Other objects are to provide knives for dicing sheet material which are simple and inexpensive to manufacture and otherwise well adapted for the purposes set forth.

Dicing machines are generally provided with a bed knife over which the sheet passes, and a fly knife which cooperates therewith for the shearing action. Both knives are serrated and their teeth intermesh with the sheet therebetween to make the cut. I have discovered that the formation of webs or strings can be eliminated by providing tip exposure, which is exposure of the tips or points of the teeth of the bed knife which are never covered by the plastic being cut. Conversely, the bases or roots of the fly knife teeth are never engaged by the plastic.

In order to provide this tip exposure, I have found it to be an essential condition that the lagging ends of the side edges of the second cut must be laterally displaced with respect to the leading ends of the side edges of the first cut. This condition can be met in three ways: first, by feeding the sheet at an oblique angle to the row of teeth on the bed knife; or second, by undercutting the teeth in the plane of the sheet, when the sheet is fed at right angles to the row of teeth. This undercutting may be defined as providing one side edge of the bed knife teeth at an obtuse angle of more than ninety degrees to the row of teeth, or other tooth shape which will provide a lateral recess at the base of the tooth. A third expedient for this purpose is to provide a vibratory feed of the sheet, by means of which the sheet moves back and forth sideways for a distance of about half a tooth between successive cuts.

According to the present invention, the preferred embodiment of the intermeshing teeth comprises a polygonal prism which is cut into the face of the knife at an angle to the cutting plane such that the cutting edges of the teeth in the stationary and rotating knives match and no interference occurs when the fly knife descends through the meshing bed knife. Where the sheet is fed at 90° to the line of cut, tip exposure of the bed knife teeth is obtained by setting the prisms at a skew angle to the cutting plane so that an undercut in the plane of the sheet results. A right triangular prism produces this effect. When the sheet is fed at 90° to the line of cut, an essentially diamond shaped particle results. By feeding at an angle less than 90° and changing the shape of the prisms, a square cut particle is produced.

Other objects and features of novelty will be apparent from the following description and the accompanying drawings, in which Fig. 1 is a perspective view of a dicing machine provided with knives according to the preferred embodiment of the present invention;

Fig. 2 is a vertical section through the knives shown in Fig. 1;

Fig. 3 is a section taken along the line 3—3 of Fig. 2, showing the fly knife in front elevation;

Fig. 4 is a section taken along the line 4—4 of Fig. 2, showing the bed knife in front elevation;

Fig. 5 is a plan view of the intermeshing teeth;

Fig. 6 is a section taken along the line 6—6 of Figs. 3 and 4;

Fig. 7 is a plan of the sheet on the bed knife in position for the dicing operation;

Fig. 8 is a plan view of the pellet or granular product produced by the operation of Figs. 1 to 7 inclusive;

Figure 9:
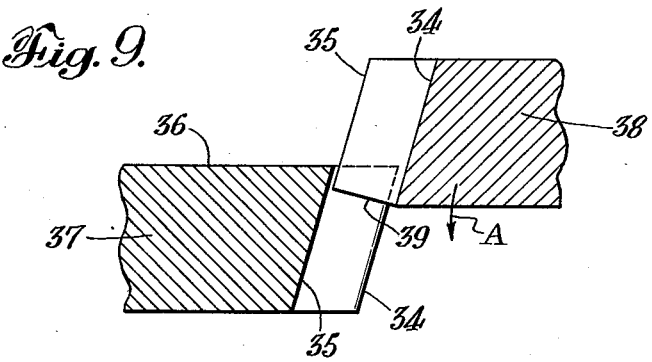
Fig. 9 is a vertical section similar to Fig. 2, but showing a modified form of the intermeshing knives.

Referring more particularly to the drawings, in Fig. 1 there is shown a bed knife 10 which is rigidly fixed on a table 12, in position to cooperate in shearing engagement with a fly knife 14 secured to a disk 15 mounted on a shaft 16 driven in the direction of the arrow A at a predetermined speed by a suitable source of power. The fly knife is preferably one of a set of such knives uniformly spaced around the face of the disk 15.

The plastic sheet 18 is fed by a pair of nip rollers 19 and 20 over the upper face of the bed knife 10 so as to be cut by the fly knives as they descend, the rolls being driven by a suitable drive in the direction of the arrows B to advance the sheet a predetermined distance in the direction of the arrow C after each fly knife passes and before the next descends.

As shown in the expired patent to Winston, No. 1,947,323, issued February 13, 1934, the Mitts and Merrill rolls 19 and 20 are driven by a worm gearing 45, drive shaft 46, cone pulley 47, and belt connection 48 to cone pulley 49 on the axle 16 of disc 15. The distance that the sheet is advanced between cuts is determined by adjusting the drive ratio of the cone pulleys.

In the form of teeth for the embodiment shown in Figs. 1 to 8 inclusive, the teeth comprise a row of right triangular prisms, the faces 22 of which are at 90° to the row and the faces 23 of which are at 45° thereto, forming an isosceles cross section shown in Fig. 6. The elements of these prisms are inclined laterally as well as being inclined away from the line of cut, as shown in Figs. 3 and 4, which results in an undercut relation of the intermeshing teeth, as shown in Fig. 5.

The bed knife 10 has a flat upper surface 25 over which the sheet 18 passes. The elements of the bed knife teeth 24 are inclined downwardly and rearwardly from the surface 25 at an angle of 36½° as shown in Fig. 2. In the plane of the row at this angle, the elements are inclined laterally at an angle of 20° to the vertical, as shown in Fig. 4.

The fly knife 14 has a lower surface 26 upwardly and rearwardly inclined from the tip 27 at an angle of 30° to the horizontal. The elements of the fly knife teeth 28 are inclined upwardly and rearwardly at an angle of 16° to the vertical, as shown in Fig. 2. In the plane of the row at this angle, the elements of the teeth are inclined laterally at an angle of 15° to the vertical plane, as shown in Fig. 3. The lateral inclination of the bed knife teeth being 20° leaves a difference of 5° for a clearance angle between the teeth.

In operation of the embodiment shown in Figs. 1 to 8 inclusive, the sheet 18 is fed by the nip rolls 19 and 20 over the surface 25 of the bed knife 10, and the fly knife 14 descends and intermeshes therewith to shear the sheet and form a serrated edge. The rolls 19 and 20 feed the sheet to advance the projections 30 shown in Fig. 7 over the recesses between the bed knife teeth 24, but to leave the indentations between the projections 30 exposing the tips of the bed knife teeth 24. When the next fly knife descends, the tips 27 of the fly knife teeth puncture the sheet at the roots of the bed knife teeth 24, and the shearing action proceeds along the inclined lower edge 26 of the fly knife teeth meshing with the flat tops of the bed knife teeth 24, toward the tips 32 of the bed knife teeth. This progressive shearing tends to squeeze the sheet material toward the bed knife tip 32, but the tip exposure is such that the squeezed material cannot reach the extreme tip. The amount of tip exposure is predetermined by correlating the degree of undercut of the sides 22 and the distance the sheet is fed by the nip rolls 19 and 20, with the elastic or flow characteristic of the material of the sheet. Thus a clean cut is produced with no webs or strings to connect the sheared particles.

With precision feeding a diamond or lozenge shaped particle 33 is produced as shown in Fig. 8. With excessive tip exposure a slight notch may be produced in the sharp corners of the diamond or lozenge, but this may be unobjectionable, or may be eliminated by reducing the tip exposure by increasing the increment of distance the sheet is fed between successive fly knives.

The form shown in Figs. 9 to 13 comprises prismatic teeth which have flat faces 34 and 35 at the tip and root. The prisms therefore have trapezoidal cross sections, which are preferably truncated equilateral triangles. The teeth may be thus symmetrical because the need of undercut with respect to the base line of the teeth is avoided, but the desired undercut with respect to the direction of feed is provided, by feeding the sheet at a skew angle of say 40° as indicated by the arrow D shown in Figs. 11 and 12. There is little or no danger of corner notching in this form, which produces the hexagonal pellet 40 shown in Fig. 10, again with no connecting webs or strings.

Figures 10, 11:
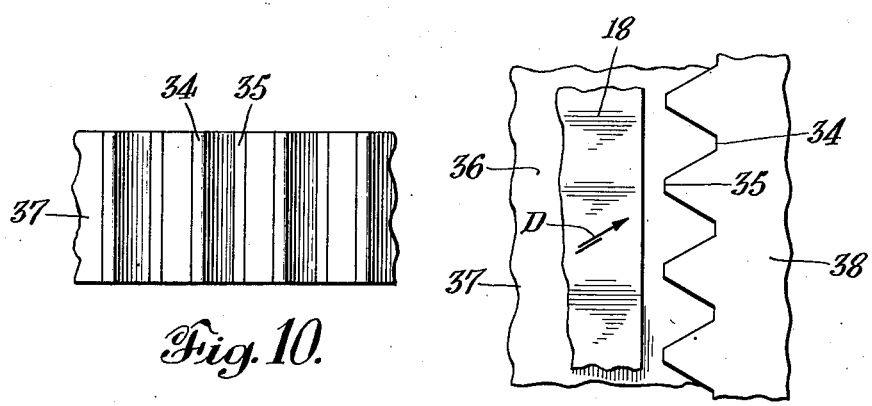
Fig. 10 is a front elevation of the bed knife shown in Fig. 9.
Fig. 11 is a plan view of the modified knives shown in Figs. 9 and 10.
Figures 12, 13:
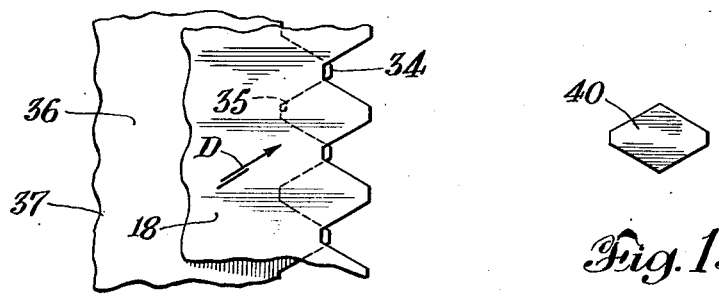
Fig. 12 is a plan view similar to Fig. 7, but showing the modified shape of teeth and cut.
Fig. 13 is a plan view of the pellet or granular product produced by the cut according to Fig. 12.

As shown in Fig. 9, the faces 34 and 35 are at an angle of 15° to the flat upper surface 36 of the bed knife 37, but as shown in Fig. 10, these teeth have no lateral inclination. The fly knife 38 has a lower surface 39 upwardly and forwardly inclined at an angle of about 15° to the plane of the sheet. This surface tends to squeeze the plastic material back toward the oncoming sheet, but with the tip exposure provided, no strings are produced.

It should be noted that the prismatic form of the teeth in both forms permits simple and inexpensive cutting or guiding in manufacture by one pass of the cutter or grinder. Both forms can be readily produced by a screw grinding machine. Furthermore, these teeth can be sharpened after they have become dull in use, by merely grinding the leading face. Inasmuch as the tooth cross section is the same for the full length, such sharpening does not change the tooth clearance. The basic principle applies equally to reel type cutters as well as to the fly wheel type shown.

I claim:

1. Method of dicing sheet material which comprises feeding the sheet to a toothed bed knife, moving a toothed fly knife toward and beyond said bed knife in a direction transverse to the plane of the sheet with the teeth of said knives in intermeshing relation in the plane of the sheet for cutting the sheet transversely along a serrated line to leave on the end of the sheet a series of alternate projections and indentations, feeding the sheet for a distance less than the length of the teeth of the bed knife, said feeding of the sheet leaving a portion of the tips of the teeth of the bed knife not covered by the sheet, then making a second cut along a similar serrated line with the forward ends of said bed knife teeth laterally displaced with respect to the rearward ends of said indentations for a distance sufficient to leave the tips of the bed knife teeth exposed, for shearing off the projections of the end of sheet formed by the first cut to form a series of individual pellets, and forming a new end of the sheet having the same series of alternate projections and indentations.

2. Method of dicing sheet material which comprises feeding the sheet to a toothed bed knife, moving a toothed fly knife toward and beyond said bed knife in a direction transverse to the plane of the sheet with the teeth of said knives in intermeshing relation in the plane of the sheet for cutting the sheet transversely along a serrated line to leave on the end of the sheet a series of alternate projections and indentations, feeding the sheet for a distance less than the length of the teeth of the bed knife, said feeding of the sheet leaving a portion of the tips of the teeth of the bed knife not covered by the sheet, then making a second cut along a similar serrated line, and between said cutting operations positioning said sheet to bring the lagging ends of corresponding side edges of the indentations of the first cut into lateral displacement with respect to the leading ends of the corresponding side edges of the bed knife teeth to leave the tips thereof exposed, whereby the projections of the end of sheet formed by the first cut are sheared off to form a series of individual pellets, and a new end is formed on the sheet having the same series of alternate projections and indentations.

3. Method of dicing sheet material which comprises feeding the sheet to a toothed bed knife at an oblique angle, moving a toothed fly knife toward and beyond said bed knife in a direction transverse to the plane of the sheet with the teeth of said knives in intermeshing relation in the plane of the sheet for cutting the sheet transversely along a serrated line disposed at an oblique angle to the longitudinal edge of the sheet to leave on the end of the sheet a series of alternate projections and indentations, feeding the sheet for a distance less than the length of the teeth of said bed knife, said feeding of the sheet leaving a portion of the tips of the teeth of the bed knife not covered by the sheet, then making a second cut along a similar serrated line disposed at the same oblique angle to the longitudinal edge of the sheet, whereby the tips of the bed knife teeth are laterally displaced with respect to the indentations of the first cut for a distance proportional to the obliquity of said angle and sufficient to leave the tips of the bed knife teeth exposed, for shearing off the projections of the end of the sheet formed by the first cut to form a series of individual pellets, and forming a new end of the sheet having te same series of alternate projections and indentations.

4. Method of dicing sheet material which comprises feeding the sheet to a toothed bed knife, moving a toothed fly knife toward and beyond said bed knife in a direction transverse to the plane of the sheet with the teeth of said knives in intermeshing relation in the plane of the sheet for cutting the sheet transversely along a serrated line in which one side edge of each serration is disposed at an oblique angle to said line to leave on the end of the sheet a series of undercut projections and alternate indentations, feeding the sheet for a distance less than the length of the teeth of the bed knife, said feeding of the sheet leaving a portion of the tips of the bed knife not covered by the sheet, then making a second cut along a similar serrated line, whereby the tips of the bed knife teeth are laterally displaced with respect to the indentations of the first cut proportional to the degree of undercut to leave the tips of the bed knife teeth exposed, for shearing off the projections of the end of the sheet formed by the first cut to form a series of individual pellets, and forming a new end of the sheet having the same series of alternate projections and indentations.

5. Method of dicing sheet material which comprises feeding the sheet to a toothed bed knife, moving a toothed fly knife toward and beyond said bed knife in a direction transverse to the plane of the sheet with the teeth of said knives in intermeshing relation in the plane of the sheet for cutting the sheet transversely along a serrated line to leave on the end of the sheet a series of alternate projections and indentations, feeding the sheet for a distance less than the length of the teeth of the bed knife, said feeding of the sheet leaving a portion of the tips of the bed knife not covered by the sheet, and, shifting the sheet laterally for a distance sufficient to expose the tips of said bed knife teeth, and making a second cut through said advanced and shifted sheet along a second serrated line, for shearing off the projections of the end of the sheet formed by the first cut to form a series of individual pellets, and forming a new end of the sheet having the same series of alternate projections and indentations.

6. Method of dicing sheet material which comprises feeding the sheet to a toothed bed knife; moving a toothed fly knife toward and beyond said bed knife in a direction transverse to said sheet with the teeth of said knives in intermeshing relation in the plane of the sheet for shearing the same along a serrated line; feeding the serrated edged sheet for a distance less than the length of the teeth of the bed knife and into position with respect to said bed knife so that the projections of said serrated edge overlie the indentations between said bed knife teeth, said feeding of the sheet leaving a portion of the tips of the teeth of the bed knife not covered by the sheet; and causing a second fly knife movement in which the teeth of said knives intermesh in the plane of the sheet but the indentations of said serrated edge expose the roots of the fly knife teeth for shearing off the projections of said serrated edge to form a series of individual pellets.

7. Apparatus for dicing sheet material comprising a toothed bed knife over which the sheet passes, a toothed fly knife, means for moving said fly knife toward and beyond said bed knife in a direction transverse to said sheet with the teeth of said knives in intermeshing relation in the plane of the sheet for shearing the same along a serrated line, means for advancing the sheet at an oblique angle to said serrated line for a distance less than the length of the teeth of the bed knife, said feeding of the sheet leaving a portion of the tips of the bed knife not covered by the sheet, and means for causing a second fly knife movement in timed relation to said sheet advancing means for making a second serrated cut in said angularly advanced sheet.

8. Apparatus for dicing sheet material as claimed in claim 7, in which the teeth of said knives are in the form of semi-hexagonal prisms inclined away from the path of relative movement and at an oblique angle to the plane of the sheet to provide clearance angles for the teeth, the parallel rectilinear elements of the semi-hexagonal prisms permitting sharpening of the teeth by parallel passes.

9. Apparatus for dicing sheet material comprising a toothed bed knife over which the sheet passes, the teeth of said bed knife having side edges converging toward their tips in the plane of the sheet, a toothed fly knife having complementary teeth adapted to intermesh with the teeth of said bed knife, means for moving said fly knife intermittently into intermeshing relation in the plane of the sheet for shearing cooperation with the bed knife, means for feeding the sheet over said bed knife during the interval between the said intermeshing of the knives for a distance less than the length, in the direction of feed, of the bed knife teeth, one side of each bed knife tooth being undercut with respect to the direction of feed, the angle of feed and said short advance leaving a portion of the tips of the bed knife not covered by the sheet so that successive operations of said apparatus will form a series of individual pellets.

10. Apparatus for dicing sheet material as claimed in claim 9, in which the teeth of said knives are in the form of prisms inclined away from the path of relative movement and at an oblique angle to the plane of the sheet to provide clearance angles for the teeth, the parallel rectilinear elements of the prisms permitting sharpening of the teeth by parallel passes.

11. Apparatus for dicing sheet material as claimed in claim 9, in which the teeth of said knives are in the form of triangular prisms inclined away from the path of relative movement and at an oblique angle to the plane of the sheet, and also inclined laterally in the same direction in the plane of relative movement to provide clearance angles for the teeth, the parallel rectilinear elements of the triangular prisms permitting sharpening of the teeth by parallel passes.

WILLIAM F. GIBBY.

References Cited in the file of this patent

UNITED STATES PATENTS

| Number | Name | Date |
| --- | --- | --- |
| 832,672 | Dobbs et al. | June 19, 1906 |
| 1,116,149 | Spegel | Nov. 3, 1914 |
| 1,515,377 | White | Nov. 11, 1924 |
| 1,579,786 | Ryberg | Apr. 6, 1926 |
| 1,614,446 | Lukens | Jan. 11, 1927 |
| 1,874,902 | Clyne | Aug. 30, 1932 |
| 2,182,219 | Ashley | Dec. 5, 1939 |
| 2,200,575 | Haskins | May 14, 1940 |
| 2,317,262 | Dusevoir | Apr. 20, 1943 |
| 2,335,515 | Jehle | Nov. 30, 1943 |